May 6, 1924.
T. G. ROBINSON
1,493,283
PROCESS AND APPARATUS FOR MAKING BUTTON BLANKS FROM PEARL STOCK
Filed Oct. 22, 1918
5 Sheets-Sheet 1
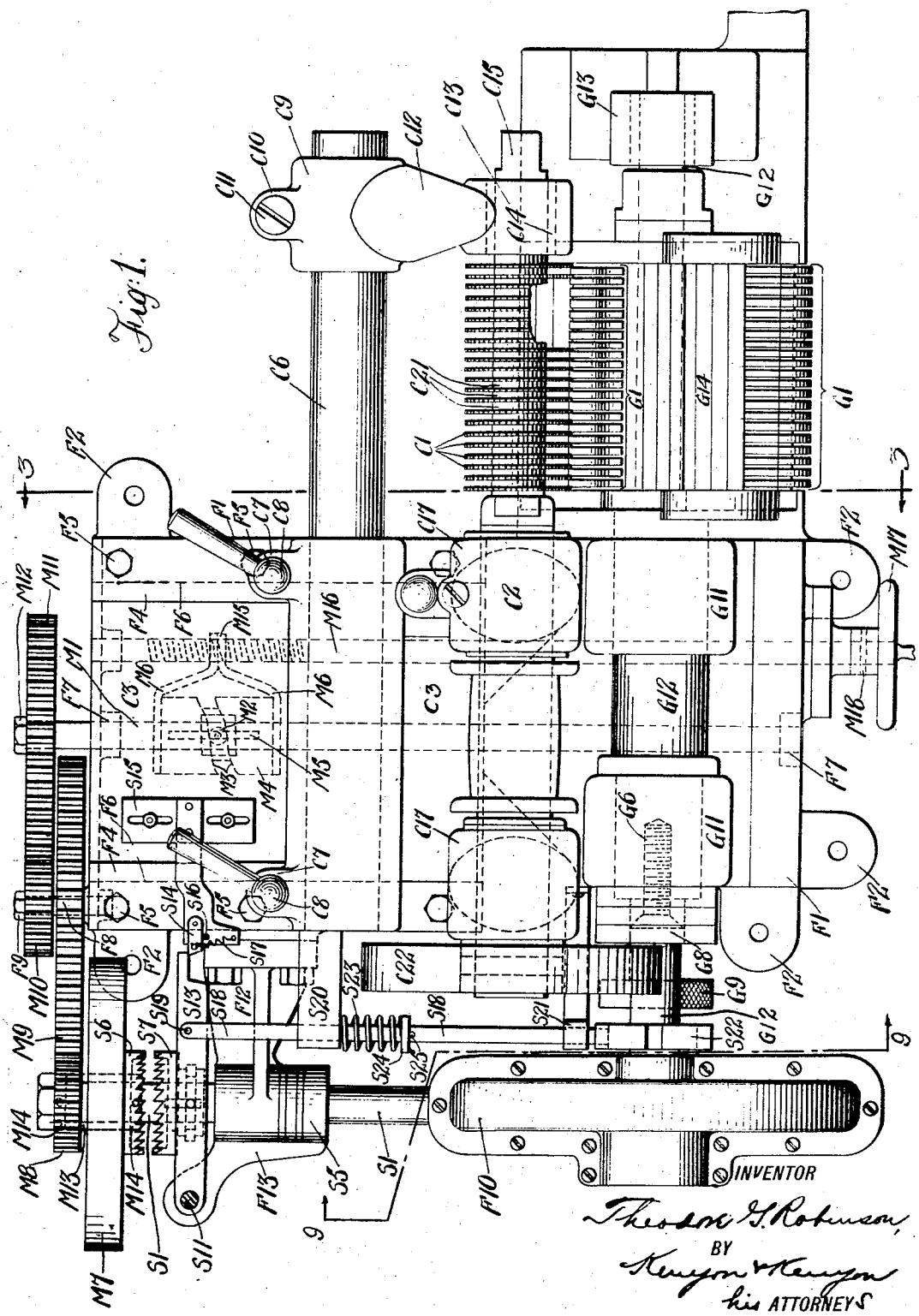

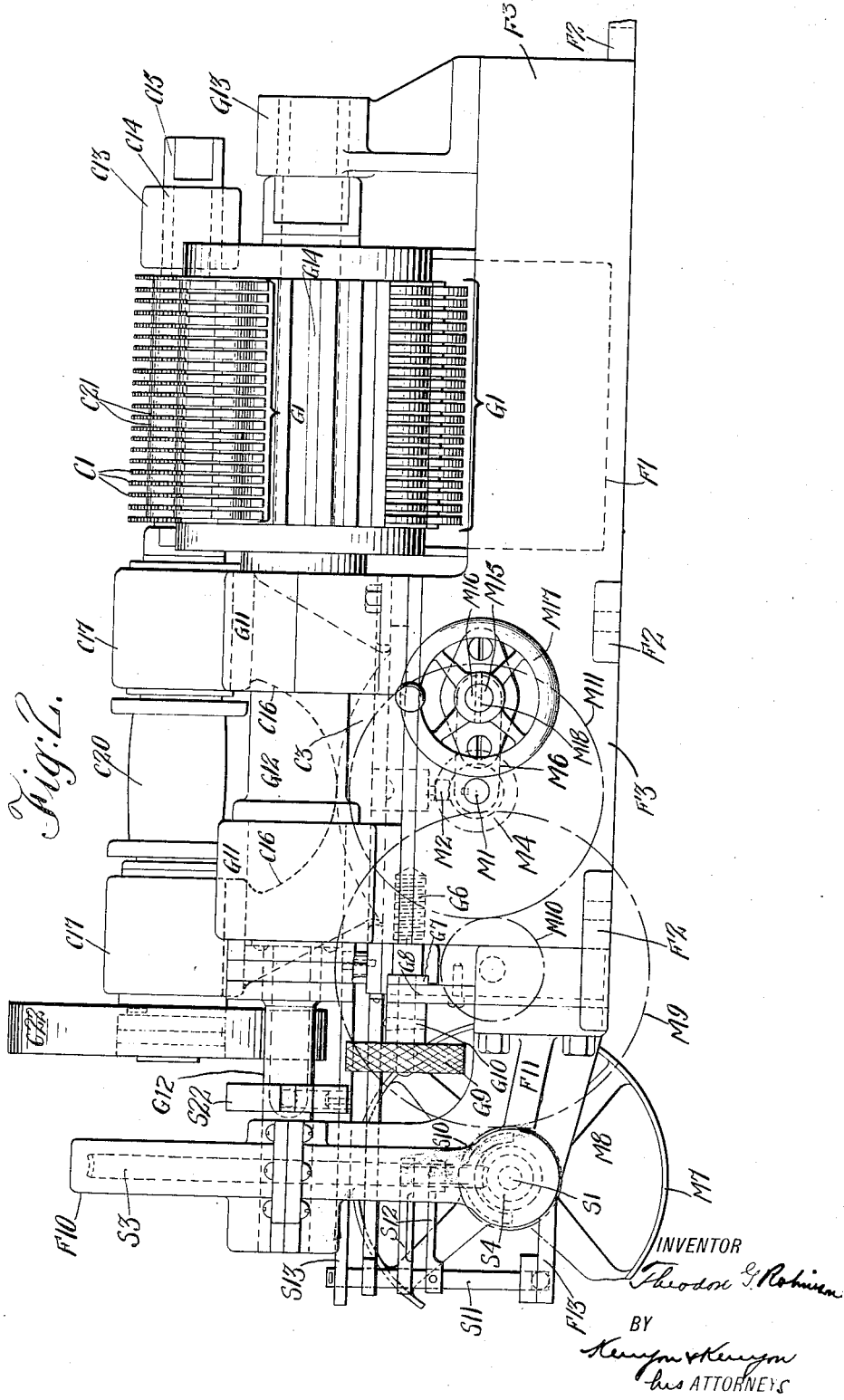

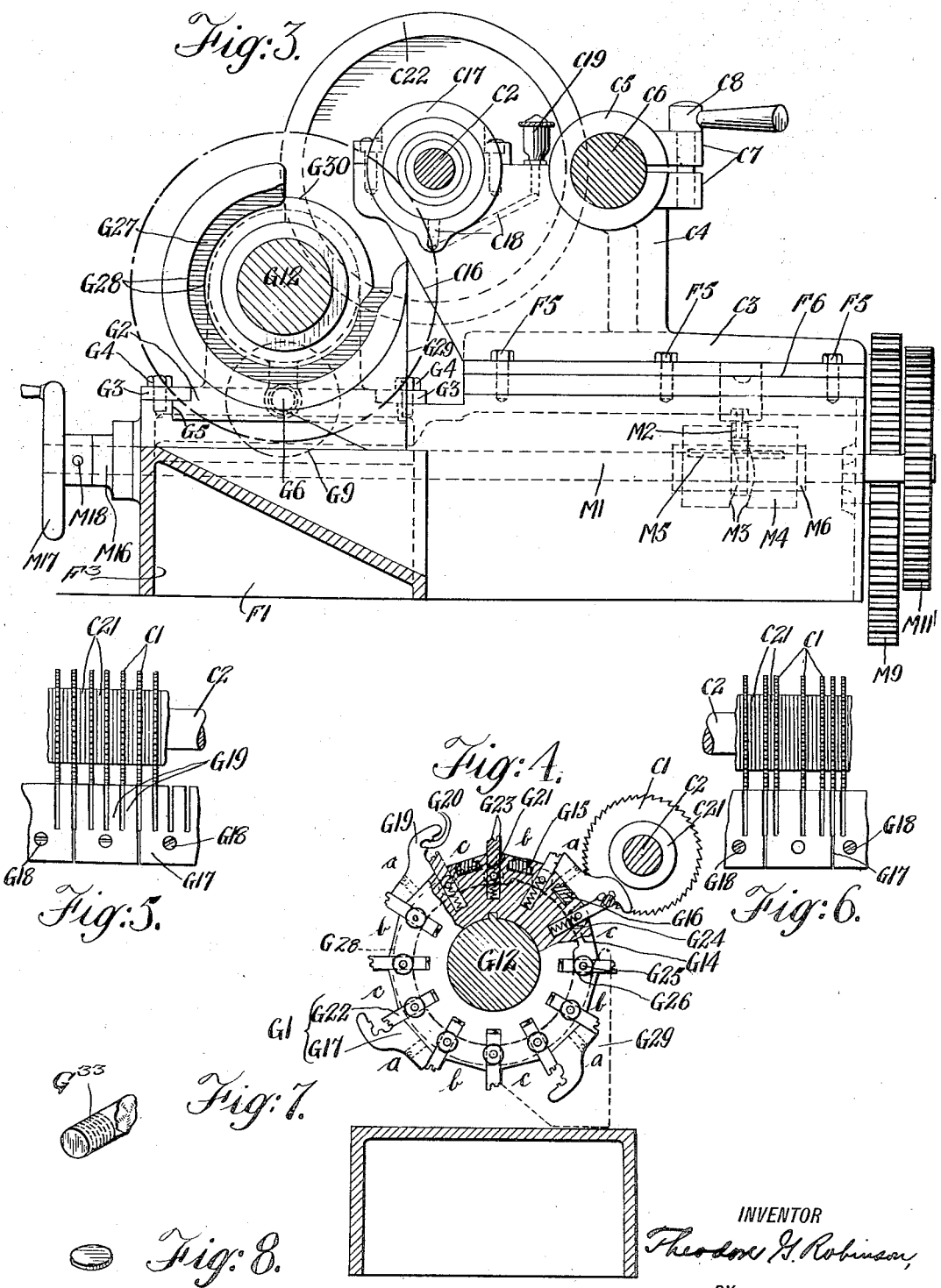

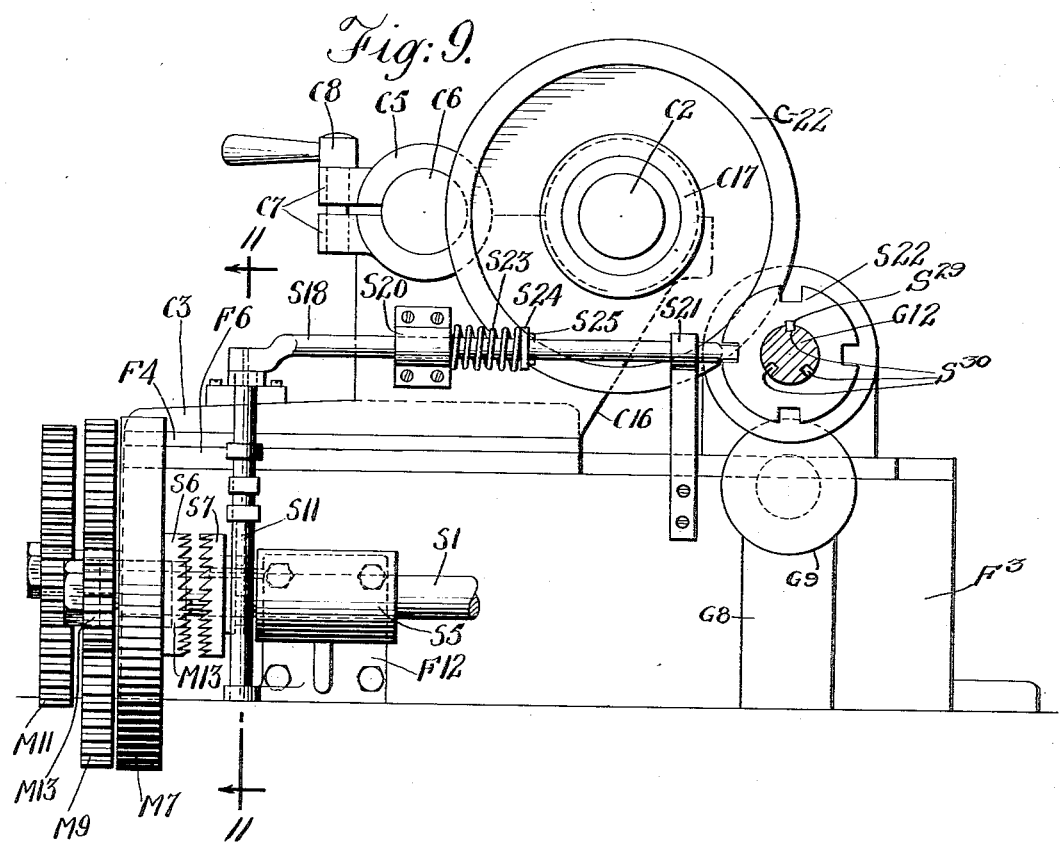
Fig. 9.
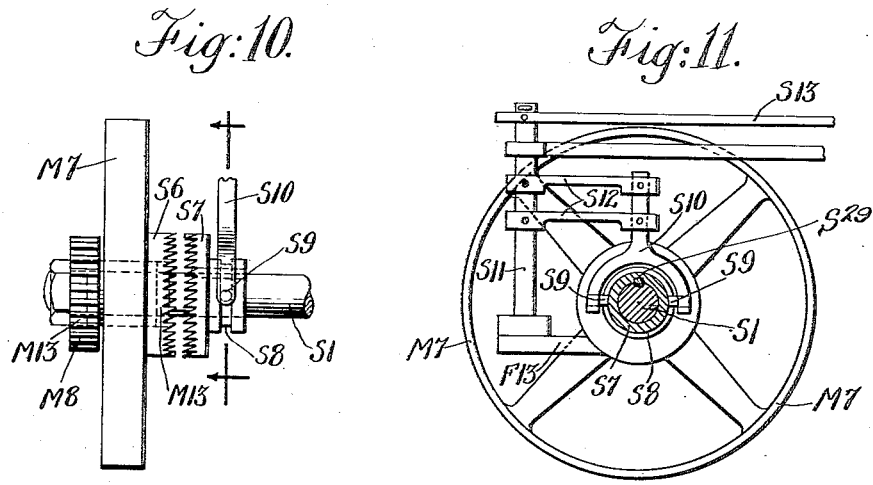
Fig. 10.
Fig. 11.

May 6, 1924.
T. G. ROBINSON
1,493,283
PROCESS AND APPARATUS FOR MAKING BUTTON BLANKS FROM PEARL STOCK
Filed Oct. 22, 1918    5 Sheets-Sheet 5
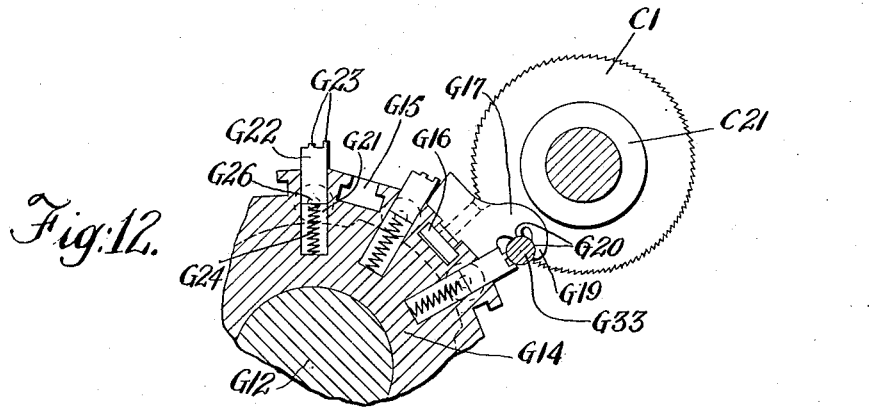
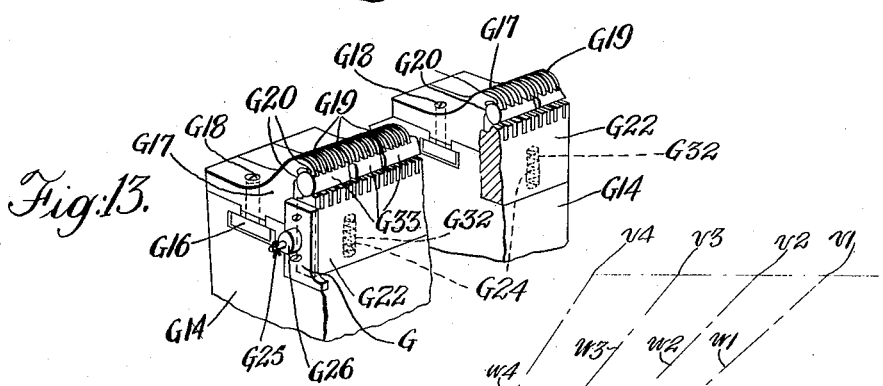
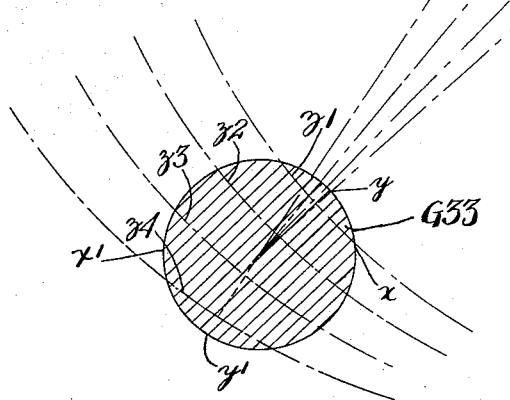
Inventor
Theodore G. Robinson
By his Attorneys
Kenyon & Kenyon Patented May 6, 1924.

1,493,283

UNITED STATES PATENT OFFICE.

THEODORE G. ROBINSON, OF OSSINING, NEW YORK.

PROCESS AND APPARATUS FOR MAKING BUTTON BLANKS FROM PEARL STOCK.

Application filed October 22, 1918. Serial No. 259,287.

*To all whom it may concern:*

Be it known that I, THEODORE G. ROBINSON, a citizen of the United States, residing at Ossining, county of Westchester, State of New York, have invented certain new and useful Improvements in Processes and Apparatus for Making Button Blanks from Pearl Stock, of which the following is a specification.

My invention relates to processes and apparatus for making from pearl stock, button blanks backed and ready for the finishing operation. It has for its object to provide a new and improved process and apparatus for making such button blanks expeditiously, cheaply and without wastage of the pearl stock; also to make a plurality of such button blanks simultaneously, to make them of proper thickness, and, where desired, to make them of varying thicknesses. It consists in the novel process and apparatus hereinafter shown and described.

Heretofore, so far as I know, no one has succeeded in a practical or commercial way in sawing or otherwise cutting button blanks from pearl stock, because of the refractory, fragile and irregularly stratified nature of the stock. Various attempts have been made by others to saw pearl stock into pearl button blanks but heretofore with great wastage of the stock and without the success in speed, quality and character of the resulting product necessary to make the process practical, and, so far as I know, it is the universal practice today and always has been, where it is desired to make more than one button blank from a pearl stock, to split the stock into thinner button blanks by a sudden blow of a knife provided with a sharp edge, and this work necessarily requires the skill and experience of a skilled pearl stock splitter. The operation is costly not only in view of the skilled labor required in the splitting operation, but also because of the crooked cleavage of the stock, the lack of control the operator has over the thickness or thinness of the blanks to be cut, and the subsequent time and labor required in "backing" the pearl blanks after they have been split, to wit, in grinding down the two faces of the blanks parallel to each other. In this splitting operation the stock splits off or fractures along the strata or path or line of least resistance through the stock, and no matter how skilled the operator may be, the stock cannot be uniformly controlled to cleave with two smooth parallel faces in planes perpendicular to the periphery of the blanks. Furthermore, in much of the stock the strata of pearl are not straight but curved or curly, so that one face or both of a blank are split irregularly, and sometimes one face will be concave and the other convex, commonly known as a "rocking-chair" blank. In these cases the faces cannot be made parallel to each other and perpendicular to the periphery of the blank without grinding off or otherwise cutting away a very large portion of each face, so that the waste in making the faces parallel in such blanks is obviously very large. Moreover, in these cases there would be a corresponding waste in the remaining part of the stock adjacent to the split face of such a blank. In many cases the curvature of these split faces of blanks is so great that if it were attempted to grind them down to make the faces parallel there would be no pearl left, and such blanks are, of course, a total loss.

Moreover, under the old system of splitting, only one blank could be split off at a time, which manifestly largely increases the cost as against a method where a plurality of blanks can be simultaneously cut off.

Furthermore, it is impossible for the pearl splitter accurately to foresee or predetermine or pre-gage the thickness of the resulting blanks split by him from the stock. The thickness of the resultant blank depends largely on chance, and in attempting to make any one a particular thickness, it is necessary to make many blanks of other thicknesses. This is an important consideration inasmuch as the market price of pearl buttons varies markedly with the varying thickness of the blanks, and this is especially true of some pearl stock such as the ocean mother-of-pearl. This difference in price is very marked between buttons, the difference in whose thickness is not greater than one-eightieth of an inch. Furthermore, some grades of thickness are largely in demand to the exclusion of other grades.

The machines that are in use for automatically finishing pearl button blanks into buttons are adapted to be set for buttons of predetermined thickness, and it is especially important that blanks of the same thickness be fed to the machine and of the thickness for which the machine is adjusted. If a thicker blank is fed to such a machine there is additional waste in grinding it down to the desired thickness. Where thinner blanks are fed to such a machine than it is adjusted for there is also a waste in cost of operation of the machine. Thus, uniformity of thickness of blanks as well as the obtaining of the precise thickness required are essential to obtaining a minimum waste in the finishing operation.

By my improvement the wastage referred to above is avoided wholly or in large part. The tendency of the stock to split irregularly is overcome; all of the blanks capable of being cut from a stock of any length can be cut simultaneously; they can be cut of any predetermined thickness desired and all of the same thickness, or some may be cut thinner or thicker than others, as desired. The wastage from irregular cleavage is practically eliminated as well as the wastage due to the irregularity of the faces of the cut blanks as they are all cut parallel; the wastage due to grinding off irregular parts of the faces of the blanks is wholly eliminated; a large part of the waste heretofore encountered in finishing the blanks is eliminated. Moreover, the stock can be cut into blanks of any desired predetermined thickness, either all of the stock being cut of the same thickness, or, if desired, some of the blanks being cut thinner or thicker than others. Thus, through my invention any desired grade of thickness of blanks may be predetermined, and in fact, the manufacture of pearl buttons is changed very largely from a speculative basis to a certain and scientific basis. My invention also eliminates the necessity of highly skilled labor and at the same time increases the output. Further objects and advantages of my invention will appear from the following description taken in connection with the accompanying drawings which form a part of the above.

In the drawings accompanying this specification I have shown an apparatus suitable for carrying out my improved process, although any other apparatus suitable for the purpose may be used. In these drawings I have also shown the preferred form or embodiment of my improved apparatus.

Referring specifically to the embodiment of my invention illustrated in the drawings, Fig. 1 is a plan view of my improved pearl button blank cutting machine in its preferred form and shows a machine capable of use in carrying out my improved process.

Fig. 2 is a front elevation of the same.

Fig. 3 is an elevation in partial cross section approximately on lines 3—3 of Fig. 1.

Fig. 4 is an elevation in partial cross section illustrating the drum with gripping apparatus associated therewith.

Fig. 5 is a partial plan somewhat enlarged showing one arrangement of saws and saw-guides or finger bars.

Fig. 6 is a similar view showing the saws unequally spaced.

Fig. 7 is a perspective view of a cylindrical pearl stock cut from the pearl shell.

Fig. 8 is a perspective view of a button blank cut from the cylindrical stock shown in Fig. 7.

Fig. 9 is a side elevation partly in section taken on the lines 9—9 of Figure 1 viewed as shown by the arrows with the worm and gear box removed particularly illustrating the mechanism for interrupting the motion transmitted to the drum and clutch or gripper members.

Fig. 10 is a side elevation of the rear end of the counter-shaft shown in Fig. 9 with the members controlling the clutch removed.

Fig. 11 is a sectional front elevation of Fig. 9 taken approximately on lines 11—11 of Fig. 9.

Figs. 12 and 13 are enlarged detail views of a part of the gripper mechanism, Fig. 12 being a section of a portion of the sectional part of Fig. 4, and Fig. 13 being a perspective view of a similar part.

Fig. 14 is a diagrammatic view illustrating the manner in which the cutting device cuts through the pearl stock.

Referring to the drawings (Figs. 1 and 2) the cutters $C^1$ are shown in the form of a number of circular saws mounted on a rotating shaft $C^2$ and constructed and arranged, as hereinafter described, to cut one or more pieces of cylindrical pearl stock suitably supported and firmly gripped by apparatus indicated at $G^1$ (Fig. 4) consisting of a series of rows of gripping devices mounted on a rotatable frame or drum so arranged as to bring the respective rows of one or more pieces of gripped stock into position for engagement with the cutters intermittently, as hereafter more fully described.

I will now describe the manner in which the cutter shaft $C^2$ is mounted and the means for moving the same toward and away from the gripping apparatus $G^1$ which holds the stock to be cut.

$F^1$ is a bed plate having suitable lugs $F^2$ through which bolts may be passed to secure the plate to any desired foundation. The machine frame $F^3$ extends vertically from said base and on this frame is mounted a carriage $C^3$ adapted to move back and forth on the frame. For this purpose the base of the carriage is suitably flanged on either side and extending over these flanges are rails $F^4$ secured to the frame by bolts $F^5$ in order to form guides $F^6$ along which the carriage may be moved forward and backward when shaft $M^1$ is rotated. For this purpose roller $M^2$ is rotatably bolted to the under side of carriage $C^3$ in such position as to operate between the cam surfaces $M^3$ of crown cam $M^4$ which is keyed on shaft $M^1$ by key $M^5$ and held in adjustable position longitudinally of the shaft by yoke $M^6$, as hereinafter described. Shaft $M^1$ is mounted so as to prevent longitudinal movement between bearings $F^7$ in the frame when pulley $M^7$ is rotated by a suitable belt this shaft is driven by means of the following apparatus; pulley $M^7$ is rigidly joined to gear wheel $M^8$, and gear wheels $M^9$ and $M^{10}$ are rigidly fastened together and mounted on spur shaft $F^8$ retained by nut $F^9$, in such position that when pulley $M^7$ is rotated its motion is transmitted through gear wheel $M^8$ to gear wheel $M^9$ and from gear wheel $M^9$ by means of gear wheel $M^{10}$ to gear wheel $M^{11}$ keyed on end of shaft $M^1$ and retained by nut $M^{12}$. Both pulley $M^7$ and gear wheel $M^8$ are mounted on a sleeve $M^{13}$ which is mounted rotatably on countershaft $S^1$ to permit their rotation independent of the countershaft $S^1$. This sleeve is retained in place by collars $M^{14}$. By means of the above gears speed is reduced.

The cam surfaces $M^3$ are so designed that when cam $M^4$ is rotated with shaft $M^1$ they will move the roller $M^2$ and, through it, the carriage $C^3$ forward slowly, while the cutters $C^1$ perform the work of cutting through the pearl stock, and then draw the carriage backward rapidly allowing a length of movement to the carriage sufficiently great to provide for clearance from the gripping apparatus $G^1$ to permit the latter apparatus to rotate a short distance. This rotation permits the removal of the blanks that have been operated upon and at the same time brings the next row of grippers with its pearl stock into alignment with the cutters ready to be operated upon by them, all as hereinafter described.

The following apparatus is provided for adjusting the operating travel of the cutters by adjusting the relative travel of the carriage. The crown-cam $M^4$ is movable lengthwise of its actuating shaft $M^1$ along key $M^5$ through an appropriate key-way. The yoke $M^6$ is suitably attached to the cam and arranged to receive through its stem $M^{15}$ the screw-threaded portion of the shaft $M^{16}$ which is suitably mounted on bearings on the frame and also has a projecting end at the front of the machine. On this projecting end there is mounted a hand-wheel $M^{17}$ fixed in place by pin $M^{18}$ so that by turning the hand-wheel in one direction or the other the relative travel of the saw-shaft is shifted either forward or backward.

The following apparatus is provided for mounting the saw shaft $C^2$ on said carriage and for preventing vibrations of the saw shaft: On the saw shaft carriage $C^3$ there is a standard $C^4$ carrying a bearing $C^5$ in which there is journaled a shaft $C^6$. This bearing $C^5$ is split and at opposite ends provided with lugs $C^7$ fitted with clamp bolts $C^8$ in order to grip the shaft $C^6$ in position, and then the bolts $C^8$ are loosened to permit the shaft $C^6$ to slide in the bearing $C^5$. As shown in Fig. 1, the shaft $C^6$ extends at one side appreciably beyond the bearing $C^5$ and adjacent its outer end is provided with a collar $C^9$. This collar $C^9$ is also split and provided with lugs $C^{10}$, and these lugs are fitted with a clamp bolt $C^{11}$ in order to grip and secure the collar $C^9$ in place on the shaft $C^6$. The collar $C^9$ is provided with an extension $C^{12}$ carrying a bearing member $C^{13}$ in which the outer end of the cutter shaft $C^2$ is supported by means of a collar bearing $C^{14}$ fitted into the journal member $C^{13}$, and maintained in position therein and held up against the saws by means of a suitable lock nut $C^{15}$. At the forward end of the saw shaft carriage $C^3$ there are standards $C^{16}$ (Fig. 2). At the upper end of each of these standards $C^{16}$ there is a bearing $C^{17}$ in which the saw shaft $C^2$ is suitably journaled. As shown in Fig. 3, the carriage $C^3$ may be provided with an oilway $C^{18}$ and fitted with a suitable cup $C^{19}$ by means of which the saw shaft bearings may be lubricated. This oil way leads from cup $C^{19}$ at first downwards and then upwards to the bearings as shown in dotted lines in Fig. 3. A balance wheel $C^{22}$ may be mounted at end of saw shaft for storing energy to preserve speed of the cutters during the heaviest drag in cutting. The shaft may be rotated in any suitable manner, as for example by a pulley $C^{20}$ mounted between the bearing $C^{17}$—$C^{17}$.

By this arrangement the saw shaft holds the saws in accurate perpendicular line with the stock gripping means without substantial lateral vibration, while the shaft is being reciprocated and is being rotated at high speed to perform the cutting.

As many circular saws as may be desired are mounted on the shaft $C^2$. It is important that the saws shall be so arranged, constructed and guided throughout the cutting action that they are held from any appreciable lateral deflection or vibration while cutting the stock. It is important that the saws be quite thin to avoid waste in the pearl stock, and to reduce resistance in the cutting. I have found that saws 14/1000 of an inch in thickness are satisfactory, although they may be used of different thicknesses. The saws are spaced on the shaft by suitable washers $C^{21}$ which may be, if desired, of different thicknesses in order to space the saws at different distances, so that in one operation button blanks of different predetermined thicknesses may be cut, depending upon orders received.

In order to make the thin saws as rigid as possible so as to prevent deflection from a plane of rotation perpendicular to their axis, the washers $C^{21}$ are made of as large a diameter as possible, while permitting clearance between them and the extremity of the projecting gripping apparatus $G^1$ carried by the rotary gripper frame or drum heretofore mentioned, as will hereinafter be more fully described. The washers thus act not only as spacers but also as supporting discs for the thin saws over a large part of their surface. The sides of these projecting fingers $G^{19}$ serve as guides for the saws so that the moment the cutting portions of the saws project between the fingers, that portion of the saw is closely guided to prevent lateral deflection or vibration, as hereinafter described; the object being to have the thin saws supported or guided throughout as much of their surface as possible to avoid lateral deflection which would result in fracturing the pearl and breaking the saws. The collars and guiding surfaces on the fingers both perform this function.

The saws preferably utilized by me in practice in the use of such a machine as that shown are 2 3/4 inches in diameter, and are spaced apart from 55/1000 to 155/1000 of an inch, according to the desired thickness of the pearl stock; while the fingers $G^{19}$ are of varying thicknesses, corresponding to the spacings of the saws, so that they fit between the saws with what might be termed a running joint clearance. For example, in the present machine where the saws are 14/1000 of an inch thick, the clearance between the fingers is 20/1000 of an inch, thus allowing 3/1000 of an inch between the sides of the saws and the guiding surfaces of the fingers so that the saws are prevented from any lateral vibration which might tend to fracture the stock or snap the thin saws. Of course, such dimensions may be widely varied to suit varying circumstances. It will be observed that the saws employed by me are of relatively small diameter and that this tends toward rigidity and aids in preventing deflection of their cutting edges. Moreover, it will be readily understood that any desired thickness of pearl blanks may be cut, within the limits of the dimensions of the pearl stock used, by predetermining the thickness of the washers $C^{21}$ and arranging the fingers $G^{19}$ to correspond. Moreover, it will be readily seen that any combination of thickness of blanks of the widest variation may be cut simultaneously by providing washers $C^{21}$ of different thicknesses, together with fingers $G^{19}$ of respective thicknesses to correspond.

The rotary frame or drum carrying the gripping apparatus $G^1$ is mounted and operated as follows: On the forward part of the frame of the machine is mounted a second carriage $G^2$ carrying the gripping apparatus, mounted on the rotatable frame or drum, and adapted to be adjusted back and forth across the frame of the machine at right angles to the direction of the first carriage $C^3$, so as to adjust the position of the gripping apparatus laterally of the saws. This carriage is flanged at opposite sides, and suitable rails $G^3$ are secured to the frame of the machine by bolts $G^4$ to provide guides $G^5$ along which the carriage may be adjusted by the operator. This carriage at its left-hand end (see Figs. 1 and 2) receives a screw-threaded bolt $G^6$ provided with a flange $G^7$ bearing against an extension $G^8$ on the frame, and also provided with a reduced end passing through and journaled in the extension $G^8$ and on this reduced end there is mounted a thumb-wheel $G^9$ fixed in place by pin $G^{10}$, so that by turning the thumb-wheel the carriage is moved across the frame. This carriage is provided with pillow-blocks having bearings $G^{11}$ in which is mounted a shaft $G^{12}$ on which is mounted the rotatable frame or drum carrying the stock-gripping apparatus $G^1$. The drum shaft is driven by an extension of shaft $G^{12}$, a worm wheel $S^3$ keyed thereon to take up travel of adjustment of carriage $G^2$ and suitably inclosed in a casing $F^{10}$ in which there is also journaled one end of the counter-shaft $S^1$ provided with a worm $S^4$ which meshes with the worm wheel $S^3$. The casing $F^{10}$ and the parts associated therewith are mounted on a bracket $F^{11}$ connected in any desired manner to the frame of the machine, and the counter-shaft $S^1$ is journaled in a bearing $S^5$ carried by a bracket $F^{12}$ which is also connected in any desired manner to the frame of the machine.

By means of intermittent drive applied to the counter-shaft $S^1$ and appropriately timed, intermittent motion is given to the rotatable frame or drum carrying the gripping apparatus $G^1$, so that the appropriate row of gripping apparatus on the drum may be moved into place during the rear portion of the travel of the saw-carrying shaft and held rigidly while the saws are moving forward and passing through the blanks. The following apparatus is provided to accomplish this: In addition to gear wheel $M^8$, the pulley $M^7$ has ratchet wheel $S^6$ rigidly fastened to it, all mounted on the shaft $S^1$ by means of the rotatable sleeve $M^{13}$. The ratchet wheel $S^7$ is keyed on counter-shaft $S^1$, but is freely movable an appropriate distance along its axis. The adjacent faces of these ratchet wheels have teeth appropriately arranged so that when they become engaged the motion of $S^6$ will be transmitted to $S^7$ and thence by means of its key to shaft $S^1$. Ratchet wheel $S^7$ is provided with a shoulder in which there is a groove $S^8$ around its circumference. In this groove are engaged two projections $S^9$ fastened to the end of each arm of the yoke $S^{10}$. On a support $F^{13}$ connected suitably with the frame of the machine is the rotatable upright $S^{11}$ to which are fastened two arms $S^{12}$ which are so fastened to the stem of the yoke $S^{10}$ that when upright $S^{11}$ is rotated back and forth through a short arc, yoke $S^{10}$ moves the ratchet wheel $S^7$ in corresponding manner along the axis of the counter-shaft $S^1$. The arm $S^{13}$ is also attached rigidly but adjustably to upright $S^{11}$ and of appropriate length to be engaged by the cam $S^{14}$, which is connected to carriage $C^3$ by an arm attached rigidly to adjustable plate $S^{15}$, whereby it is subject to adjustment, so that, as carriage $C^3$ is moving backward this cam $S^{14}$ is braced against the pin $S^{16}$ and communicates its motion to arm $S^{13}$, the length of which is so adjusted as to maintain engagement of cam $S^{14}$ just long enough to move it backward and thus rotate $S^{11}$ enough to bring the two ratchet surfaces of cam wheels $S^6$ and $S^7$ into engagement, after which cam $S^{14}$ rides over the end of arm $S^{13}$. Cam $S^{14}$ is pinned rotatably so that on the forward motion of the carriage $C^3$ the cam rides over end of arm $S^{13}$ and is then pulled back into position against pin $S^{16}$ by spring $S^{17}$. One end of rod $S^{18}$ is movably attached to arm $S^{13}$ by pin $S^{19}$ and supported by bearings $S^{20}$ and $S^{21}$ suitably fastened to frame of the machine, in such manner that the opposite end of the rod fits into sockets in the locking-wheel $S^{22}$, keyed on the shaft $G^{12}$. The number of these sockets is determined to correspond with the number of rows of gripping apparatus to be employed during the operation of the machine. In these specifications I show four sockets. A spring $S^{23}$ is mounted on rod $S^{18}$ between bearing $S^{20}$ and collar $S^{24}$ held in place by pin $S^{25}$ so that in the absence of contrary forces it will tend to force the rod into any available socket of locking-wheel $S^{22}$ as soon as such socket comes into appropriate position and in doing so the rod will pull forward arm $S^{13}$ and disengage ratchet wheel $S^7$ from $S^6$. The operation of this apparatus is as follows:— As the carriage $C^3$ goes backward cam $S^{14}$ engages end of arm $S^{13}$ long enough to carry it backward, engage ratchet wheel $S^7$ with $S^6$, by this means starting shaft $G^{12}$ and wheel $S^{22}$ to rotate, and retract rod $S^{18}$ while the socket it has just occupied in locking-wheel $S^{22}$ passes by; as cam $S^{14}$ releases arm $S^{13}$, spring $S^{23}$ forces rod $S^{18}$ forward and its end rides on the face of the locking-wheel $S^{22}$, still holding ratchet wheels $S^6$ and $S^7$ in engagement, until the next socket in locking-wheel $S^{22}$ comes into its position opposite end of rod $S^{18}$; then spring $S^{23}$ forces rod forward into this socket disengaging ratchet wheels $S^6$ and $S^7$ and locking end of rod in this socket of wheel $S^{22}$, thus stopping rotation of shaft $S^2$ and the drum carrying gripping apparatus $G^1$.

Wheel $S^{22}$ is keyed on shaft $G^{12}$ by key $S^{29}$ entering a keyway $S^{30}$ in wheel $S^{22}$ as shown in Figs. 9 and 11 in such position that each of the appropriate rows $a$ (Fig. 4) of the gripping apparatus $G^1$ is in correct position for the saws $C^1$ to pass through the blanks they hold as these rows come sequentially into position. The whole is so timed that the change of position of rows $a$ of gripping apparatus takes place from one row to the next at the backward portion of the movement of the saw carriage after the blanks have been cut through and the saws have retired sufficiently not to interfere with the change of position of gripping apparatus $G^1$. Apparatus as shown has provision for additional rows of gripping apparatus $b$ and $c$ on the same drum. Any one of the three sets of rows $a$, $b$, or $c$ can be made operative by providing wheels $S^{22}$ with three keyways $S^{30}$ shown in Fig. 9, arranged at equal arcs apart, and bringing the appropriate keyway into alignment with the keyway of shaft $G^{12}$ and inserting key $S^{29}$. In Fig. 9 the arrangement makes operative the rows $a$.

This will allow the machine to have three different combinations of gripping apparatus set up for immediate use, thus providing for rapid change from one size of blank to another or one combination of predetermined thicknesses to another.

The drum shaft $G^{12}$ also extends an appreciable distance beyond the bearings $G^{11}$ and at its outer end is suitably journaled in a bearing $G^{13}$ mounted on the frame of the machine. The gripping apparatus $G^1$ is mounted on the shaft as shown, between the bearings $G^{11}$ and $G^{13}$ and in the present embodiment of the invention, is arranged and constructed as follows: A rotary frame, in the form of a drum $G^{14}$, is mounted to rotate with the shaft, and on this drum are mounted the means for gripping the stock to be cut. In the face of this drum there is provided a series of suitably spaced under-cut grooves $G^{15}$, Fig. 4, running parallel to the axis of the drum. In each of these grooves there are keeper nuts $G^{16}$. Mounted on the drum and in alignment with each under-cut groove, I employ finger bars $G^{17}$. Each finger bar is provided with one or more screws $G^{18}$ passing therethrough and into a corresponding keeper nut $G^{16}$ in order to secure the finger bar and its associated parts in a position on the face of the drum, which is independently adjustable for each finger bar longitudinally thereof and the drum shaft. On each finger bar $G^{17}$ there is a series of the spaced fingers $G^{19}$, and on each finger $G^{19}$ there are one or more lugs $G^{20}$ having concave surfaces adapted to receive a cylindrical blank of pearl or other material, as hereinafter described.

Also in the drum $G^{14}$ and intermediate of the undercut grooves $G^{15}$ there are grooves $G^{21}$. In each groove $G^{21}$ I employ a gripper bar $G^{22}$. At the upper edge each gripper bar $G^{22}$ is provided with a series of projecting grippers $G^{23}$ also having a slightly concave gripping surface so as to coact with the lugs $G^{20}$ to grip the cylindrical pearl stock to be cut. As one of the bars $G^{22}$ is moved outward by suitable means, the stock is gripped and firmly held by the projections $G^{20}$ and $G^{23}$ from deflection laterally of the saws.

The stock $G^{33}$ (in the form shown in Fig. 7) is placed in rows against the front edges of the hooked fingers before it is brought into position for cutting and while its gripper bar is held depressed to receive the stock, and suitable means are provided for automatically and sequentially moving the respective gripping bars $G^{22}$ used in operation of the machine outward to grip the stock prior to the commencement of the cutting of the same—i. e., the passing of the saws therethrough, and to automatically release the blanks when they have been cut. This means is as follows: Beneath the gripper bar and in the base of the corresponding groove, I employ one or more springs $G^{24}$ projecting upward into holes $G^{32}$ cut in the gripper bar (Fig. 13) tending at all times to thrust the gripper bar outwardly in a radial direction. On the ends of each gripper bar are screw plates G, sufficiently larger than the cross-section of the gripper bars, to hold the latter from shifting lengthwise in their grooves and on these plates, on the ends of each gripper bar, are fitted trunnions $G^{25}$ on which are mounted rollers $G^{26}$. At the opposite ends of the drum I employ cam members $G^{27}$ (Fig. 3) the cam faces $G^{28}$ of which are preferably circular and extend, roughly, through about three-fourth of a circle. Each cam member is secured in position by a frame $G^{29}$ suitably attached to the frame of the machine. The rollers $G^{26}$ travel between the cam surfaces $G^{28}$ throughout the angular embrace of said surfaces, and when so traveling the gripper bars are held depressed in their inner positions against the springs in order that the grippers may be held separated during this time to properly receive the cylindrical blanks of pearl stock. The cam members are so arranged that the rollers of each gripper bar are released from or pass out of the groove between the cam surfaces just prior to the time that the bar is brought in position for the stock gripped thereby to be engaged by the saws and at such time, as the rollers $G^{26}$ leave the groove and travel over the top of the projecting cam surface $G^{30}$ (Fig. 3), the springs thrust the gripper bar outward to force the stock firmly against the projections $G^{20}$ to grip the same, and the stock is thus held gripped by the action of the springs or of the cam surfaces until said stock has been cut into blanks. After the saws have been passed through the stock to cut the blanks (illustrated in Fig. 8), the rollers $G^{26}$ again enter the groove between the cam members, depressing the springs and automatically releasing the sawed blanks.

It will be observed that to insure passing the saws entirely through the blanks, the saws extend toward the gripper bars $G^{22}$ beyond the projections $G^{23}$ on the upper edge of the same.

In Fig. 5 I have shown a portion of the saw shaft and part of a row of fingers, the saws being evenly spaced on the shaft; while in Fig. 6 I have shown a similar view, but with the saws unevenly spaced to cut blanks of different thicknesses.

In the operation of the machine the saw shaft is driven at an exceedingly high speed relatively to the speed of approach of the saws in cutting through the pearl stock. For example, the saw shaft may be driven at approximately a speed of 3000 revolutions per minute while the saws may make only eight or ten cuts per minute.

It will be noted, as shown in Fig. 4, that the location of the centre of the cutters $C^{1}$ is considerably above the centre of the pearl stock blank $G^{33}$ being cut, or, in other words, they are in different horizontal planes. This fact, coupled with the fact that the cutters during the cutting operation, are moving horizontally (see Figs. 1 and 3), thereby causing the cutters and pearl stock to approach each other in a horizontal plane, causes each blank to be cut, not equally along both sides of its middle horizontal diameter but from a point on its circumference considerably above the right hand end of such diameter downward toward a point on the opposite circumference considerably below the left-hand end of such diameter. The last small segment to be cut is accordingly cut along a line somewhat at an acute angle to its surface instead of being cut at right angles to such surface, as would be the case if the cutter had entered at the right-hand end of the horizontal diameter and left at the left-hand end of such diameter. This decreases the tendency of the last small segment, that is being cut, to split off irregularly. For further clearness on this point, I present in Fig. 14 a diagram of a pearl stock blank and part of the circumference of a cutter, illustrating the progress of the cutting through the blank. $x$ and $x^{1}$ represent the right and left-hand ends of the horizontal diameter of the blank $G^{33}$, $y$ the point where the cutter enters the blank, $y^{1}$ where it leaves the blank, and the various dotted curved lines $z^{1}$, $z^{2}$, $z^{3}$ and $z^{4}$ indicate the lines of cutting at different points of time. $v^{1}, v^{2}, v^{3}, v^{4}$ represent the centre of the cutting devices at different points in its approach, and $w^{1}$, $w^{2}$, $w^{3}$, $w^{4}$ represent the lines connecting such centers with the center of the pearl blank G³³. It will be noted that the line of direction of the bodily approach of the cutting device toward the pearl stock is oblique to the line connecting the centers of the pearl stock and cutting device. Were this line of approach along the line connecting such centres, the bodily advance or approach of the cutting device to the pearl stock would be at right angles, or substantially so, to the curved face of the stock being cut, and this would tend to cause such face, especially in the last small segment being cut, to split irregularly. By my improved method of cutting this tendency is decreased, or almost wholly eliminated.

Pearl stock as cut from the shell is usually in cylindrical form, but any suitable form of pearl stock may be operated upon by my invention and any suitable cutting device made of any suitable material may be employed. The apparatus shown in the drawings is especially adapted for operating upon cylindrical pearl stock.

Any suitable cooling means may be employed, if desired, to cool the rapidly driven parts of my improved apparatus, but as these form no part of my invention I have not illustrated such devices in the drawings. I have also shown the motion of certain parts of the apparatus shown in the drawings, as intermittent and other parts as reciprocating, but it is not essential to my invention in its broader aspects that intermittent or reciprocating motion be employed.

For the purposes of clearness, the term "pearl stock" is used herein to designate the material upon which my improved process and apparatus are intended to operate. Heretofore blanks cut from the pearl shell have been made into buttons in some instances by taking the blank thus cut from the shell and directly grinding it at either or both ends as necessary to form the finished button blank ready for the design to be given to it. In many cases, however, the blanks thus cut from the shell are long enough to make two or more button blanks, and in these cases the blank cut from the shell is split into two or more parts and each part is treated by grinding one or both end surfaces. When a blank cut from the pearl shell has thus been split it is generally known as a split blank. The term "pearl stock" is used herein broadly to include all such blanks cut from the pearl shell whether split or not, although the full advantages of my improved process and apparatus are best secured when the longer blanks are cut by my improved process and apparatus without any preliminary splitting.

Such "pearl stock" is punched or cut out of the pearl shell in a direction substantially at right angles to the strata or grain of the pearl shell so that when later in my improved process the pearl stock is itself cut as described above, this cutting lies in the line of or parallel with, the said strata or grain. This adds very much to the difficulty of cutting it properly as described herein, and distinguishes it from the cutting of wood, and other similar substances, where the cutting is performed at right angles to the grain and where the difficulties met with in cutting pearl stock are not present. While such pearl stock as cut is usually cylindrical, it might be cut in some other form such as hexagonal, and applicant does not limit himself to the cylindrical form. But pearl stock is always cut from the shell in the general form of a rod or bar and it is in this sense that the term "pearl stock" is used throughout the specification and claims herein.

What I claim as new and desire to secure by Letters Patent is as follows:

1. The process of making button blanks simultaneously from a plurality of pearl stocks, which consists in firmly holding each pearl stock at more than two places in its length, and cutting said stocks in parallel planes simultaneously at points between said places.

2. The process of making button blanks simultaneously from a plurality of pearl stocks, which consists in firmly holding each pearl stock at opposite sides of the stock at more than two places in its length, and cutting said stocks in parallel planes simultaneously at points between said places.

3. The process of making button blanks with parallel faces simultaneously from a plurality of pearl stocks, which consists in cutting through the pearl stocks at the same time and at the same rate in parallel planes spaced apart the desired thickness of the button blanks to be formed, and firmly holding the parts of the pearl stocks which are to form the button blanks, whereby the tendency of the cutting on either side of each blank to split the blank irregularly will be counteracted by the cutting on the other side.

4. The process of making button blanks with parallel faces simultaneously from a plurality of pearl stocks, which consists in cutting through the pearl stocks at the same time and at the same rate in parallel planes spaced apart the desired thickness of the button blanks to be formed, and firmly holding on opposite sides each part of each pearl stock which it to form a button blank.

5. The process of simultaneously making a plurality of button blanks from a plurality of pearl stocks, which consists in firmly holding each pearl stock at more than three places in its length, cutting each of said stocks in more than two parallel planes simultaneously at more than two points between said places, whereby a plurality of button blanks having parallel faces may be simultaneously formed from each of said pearl stocks.

6. The process of simultaneously making a plurality of button blanks with parallel faces from a plurality of pearl stocks, which consists in simultaneously cutting through all of the pearl stocks at the same time and at the same rate in more than two parallel planes for each pearl stock spaced apart the desired thickness of the button-blanks to be formed from said pearl stocks, and firmly holding the parts of each pearl stock which are to form the button blanks, whereby the tendency of the cutting on either side of each of the said blanks to split the blank irregularly will be counteracted by the cutting on the other side.

7. The process of simultaneously making a plurality of button blanks from pearl stock, which consists in firmly holding the pearl stock at more than three places in its length, cutting said stock simultaneously at more than two points between said places and in parallel planes spaced apart from one another at different distances to cut blanks of different thicknesses, whereby a plurality of pearl button blanks having parallel faces and having different thicknesses may be simultaneously cut from the same stock.

8. The method of simultaneously forming shell pearl button blanks from a plurality of cylindrical pearl stocks, which consists in firmly gripping said pearl stocks in such a manner that the portions of the pearl stocks that are to be cut off to form the button blanks are held firmly from displacement angularly from the axis of the pearl stocks to prevent disruption or irregular splitting of the button blanks during the cutting, and while so gripped causing cutters simultaneously to traverse the pearl stocks perpendicularly to the axis of the same, whereby a plurality of button blanks having parallel faces may be cut.

9. The method of simultaneously forming shell pearl button blanks from a plurality of pearl stocks, which consists in firmly gripping and backing up the periphery of each of said pearl stocks in such manner that the portions of the pearl stock that are to be cut off to form the button blanks are held firmly from displacement angularly from the axis of the pearl stock, and the periphery of each of said portions is firmly backed up against the thrust of cutting means to prevent disruption or irregular splitting of the pearl stock during the cutting, and while so gripped and backed causing a cutter to traverse each of the pearl stocks perpendicularly to the axis of the same, whereby a plurality of button blanks having parallel faces may be simultaneously cut from a plurality of pearl stocks.

10. The method of forming shell pearl button blanks of predetermined thickness, which consists in firmly gripping and backing up the periphery of a plurality of pearl stocks at intervals along the length of each pearl stock and at the portions thereof to form the peripheries of the button blanks to be cut and in such manner that a portion of each of the pearl stocks, sufficient to form a plurality of button blanks and from which the button blanks are to be cut, is held firmly from displacement angularly from the axis of the pearl stock, and that the peripheries of said button blank portions are firmly backed up against the thrust of cutting means to prevent disruption or irregular splitting during cutting, and while so gripped and backed causing cutting means simultaneously to traverse each of the pearl stocks between the different points of support perpendicular to the axis of the stock, and guiding the edges of the cutting means from lateral displacement substantially throughout their cutting operation, whereby a plurality of button blanks of predetermined thickness and with parallel faces may be simultaneously cut from a plurality of pearl stocks without undue waste.

11. In a machine for cutting button blanks from pearl stock, the combination of holding devices for firmly gripping the pearl stock at more than two points in its length, a plurality of parallel cutters adapted, when in operative engagement with the pearl stock, simultaneously to cut through the same to form pearl button blanks with parallel faces, and means for spacing the cutters at varying distances apart, whereby blanks of the same thickness or of varying thickness may be cut from the stock.

12. A machine for cutting pearl button blanks, comprising a plurality of spaced cutters, devices for gripping a plurality of cylindrical pearl stocks, and means for bringing said devices and cutters into operative engagement in order to cut at one operation a multiplicity of button blanks from a plurality of pearl stocks.

13. A machine for cutting pearl button blanks, comprising a plurality of spaced cutters, devices for gripping a plurality of cylindrical pearl stocks, means for normally maintaining said devices in spaced positions for receiving the cylindrical pearl stocks and closing said devices to secure the cylindrical stocks in place during the cutting operation, and means for bringing said devices and cutters into operative engagement in order to cut in one operation a multiplicity of button blanks from a plurality of pearl stocks, 14. A machine for cutting pearl button blanks, comprising a plurality of spaced and adjustably mounted cutters, a plurality of grippers having fingers spaced intermediately of the said cutters, and means for bringing said grippers and cutters into operative engagement in order to cut in one operation a multiplicity of button blanks.

15. A machine for cutting pearl button blanks, comprising a plurality of spaced and adjustably mounted cutters, a plurality of grippers each having fingers spaced intermediately of the cutters, means for adjusting the said grippers to position relatively to the cutters, and means for bringing the said grippers and cutters into operative engagement in order to cut at one operation a multiplicity of button blanks.

16. In a machine for cutting pearl button blanks from pearl stock, devices for cutting from such pearl stock a plurality of button blanks of different and predetermined thicknesses, and simultaneously backing each of the same.

17. A machine for cutting button blanks, comprising a frame, a plurality of spaced revoluble saws mounted therein, a pearl stock drum shaft journaled in said frame, a stock drum secured on the said shaft, a plurality of clamp bars adjustably secured in position on the said drum and each terminating in a plurality of spaced fingers, a gripper bar coacting with each clamp bar, a spring for normally projecting each clamp bar outwardly in a radial direction, rollers mounted on the end of each gripper bar, and cam members on the faces of which the said rollers run in the revolution of the drum to normally maintain the gripper bars in depressed positions to permit pearl stock being placed between the gripper bars and the fingers of the clamp bars, said rollers running off the faces of the cams prior to the time when the pearl stocks come into contact with the saws while the rollers run onto the faces of the cams again after the sawing operation to release the button blanks cut from the pearl stocks.

18. A machine for cutting button blanks comprising a frame, a plurality of spaced revoluble saws mounted therein, a pearl stock drum shaft journaled in said frame, a pearl stock drum secured on the said shaft, the said drum being provided with a series of under-cut grooves in the surface thereof, a keeper member in each under-cut groove, a clamp bar secured to each keeper member and provided with a plurality of spaced gripper fingers, a gripper bar associated with each clamp bar and mounted in the said drum, a spring for normally projecting each gripper member outwardly in a radial direction, rollers mounted on each gripper member, a cam at each end of the said drum on the faces of which the said rollers are adapted to travel and to maintain the gripper members in depressed positions within the drum except when pearl stocks carried between the said gripper members and the fingers on the clamp bars are being cut by the said saws, and means for adjusting the said drum to position relatively to the spaced positions of the said saws.

19. A machine for cutting button blanks comprising a frame, a saw shaft journaled therein, a plurality of revoluble saws mounted in spaced positions on the said saw shaft, means for adjusting the said saw shaft to position transversely of its axis, a pearl stock drum shaft, a drum mounted thereon, the said drum being provided with a series of under-cut grooves in the surface thereof, a keeper member in each under-cut groove, a clamp bar secured to each keeper member and provided with a plurality of spaced gripper fingers, a gripper bar associated with each clamp bar and mounted in the said drum, a spring for normally projecting each gripper member outwardly in a radial direction, rollers mounted on each gripper member, a cam at each end of the said drum on the faces of which the said rollers are adapted to travel and to maintain the gripper members in depressed positions within the drum except when pearl stocks carried between the said gripper members and the fingers on the clamp bars are being cut by the said saws, and means for adjusting the said drum to position relatively to the spaced positions of the said saws.

20. A machine for cutting button blanks, comprising a frame, a saw shaft carriage movable therein, a saw shaft journaled in the said carriage, a plurality of circular saws mounted in spaced positions on the said saw shaft, means for adjusting the saw shaft in position so as to move the saws in their own planes, a pearl stock drum shaft carriage also mounted in said frame, a drum shaft provided with a plurality of under-cut grooves, and intermediate recesses both running parallel to the axis of the drum, a keeper member in each of said under-cut grooves, a clamp bar secured to each keeper member and provided with a plurality of fingers, spaced the same as the said saws, a gripper bar mounted in each of the said intermediate recesses and adapted to coact with the corresponding clamp bar and the fingers thereof, a spring for normally projecting each gripper member outwardly in a radial direction, rollers mounted on each gripper member, a cam at each end of the said drum on the faces of which the said rollers are adapted to travel and to maintain the gripper members in depressed positions within the drum except when pearl stocks carried between the said gripper fingers on the clamp bars are being cut by the said saws, and means for adjusting the said drum to position relatively to the spaced positions of the said saws.

21. In a machine for cutting button blanks from pearl stock, the combination of holding devices for firmly gripping a plurality of pearl stocks at a number of points in the length of each pearl stock, a plurality of parallel cutters adapted, when in operative engagement with the pearl stocks, simultaneously to cut through the same from the same side to form a plurality of pearl button blanks with parallel faces, and means for moving the cutters and stocks into operative relation to each other.

22. The process of making button blanks from a plurality of pearl stocks which consists in simultaneously cutting a plurality of button blanks from said pearl stocks.

23. The process of making button blanks from a plurality of pearl stocks, which consists in simultaneously cutting in parallel planes a plurality of button blanks from each of said pearl stocks.

24. The process of making button blanks from a plurality of pearl stocks which consists in holding the pearl stocks from lateral displacement at more than two points in the length of each pearl stock and cutting simultaneously the stocks between said points.

25. In a machine for cutting button blanks simultaneously from a plurality of pearl stocks, the combination of means for holding the pearl stocks from lateral displacement at more than two points in the length of each pearl stock, and cutting means for simultaneously cutting the stocks between said points.

26. The process of making button blanks from a plurality of pearl stocks which consists in holding the stocks from lateral displacement, and cutting button blanks therefrom by simultaneously cutting through the said stocks from one side to the other.

27. The process of making button blanks from a plurality of pearl stocks which consists in holding the stocks from lateral displacement and simultaneously cutting a plurality of button blanks therefrom by cutting at the same time and at the same rate through all of said stocks from a point on one side of the stocks to a point on the other side.

28. In a machine for cutting button blanks from pearl stock the combination of means for holding a plurality of pearl stocks, and a gang of cutters adapted to be brought into operative connection with said stocks successively to cut button blanks therefrom.

29. In a machine for cutting button blanks from pearl stock the combination of means for holding a plurality of pearl stocks, a gang of parallel cutters, and means for bringing the pearl stocks successively into operative engagement with the cutters to cut button blanks successively from the different pearl stocks.

30. In a machine for cutting button blanks from pearl stock the combination of means for holding a plurality of pearl stocks at a plurality of points in the length of each pearl stock, a cutting device, and means adapted to cause the pearl stocks successively and the cutting device, to come into operative engagement to cut through said stocks successively between the holding points.

31. In a machine for cutting button blanks from pearl stock the combination of means for holding a plurality of pearl stocks at more than two places in the length of each stock, a gang of parallel cutters, and means for bringing the cutters and pearl stocks successively into operative engagement, in order simultaneously to cut from each stock, as said stock and the gang of cutters engage, a plurality of button blanks.

32. In a machine for cutting button blanks from pearl stock the combination of means for holding a plurality of pearl stocks, and a gang of cutters adapted to be brought into operative connection with said stocks simultaneously to cut button blanks therefrom.

33. In a machine for cutting button blanks from pearl stock the combination of means for holding a plurality of pearl stocks, a gang of parallel cutters, and means for bringing the pearl stocks and cutters simultaneously into operative engagement with each other to cut button blanks simultaneously from the different pearl stocks.

34. In a machine for cutting button blanks from pearl stock the combination of means for holding a plurality of pearl stocks at a plurality of points in the length of each pearl stock, a cutting device and means adapted to cause the pearl stocks and the cutting device to come into operative engagement to cut through said stocks simultaneously between the holding points.

35. In a machine for cutting button blanks from pearl stock the combination of means for holding a plurality of pearl stocks at more than two places in the length of each stock, a gang of parallel cutters, and means for bringing the cutters and pearl stocks simultaneously into operative engagement, in order to cut simultaneously from said stocks a plurality of button blanks.

36. In a machine for cutting button blanks from pearl stock the combination of means for holding a plurality of pearl stocks, and a gang of cutters adapted to be brought into operative engagement with said stocks to cut button blanks therefrom.

37. In a machine for cutting button blanks from pearl stock the combination of means for holding a plurality of pearl stocks, a gang of parallel cutters, and means for bringing the pearl stocks into operative engagement with the cutters to cut button blanks from the different pearl stocks.

38. In a machine for cutting button blanks from pearl stock, the combination of means for holding a plurality of pearl stocks at a plurality of points in the length of each pearl stock, a cutting device, and means adapted to cause the pearl stocks and the cutting device to come into operative engagement to cut through said stocks between the holding points.

39. In a machine for cutting button blanks from pearl stock, the combination of holding devices for firmly gripping the pearl stock at more than two points in its length, a plurality of parallel extremely thin cutters adapted, when in operative engagement with the pearl stock, simultaneously to cut through the same to form pearl button blanks with parallel faces, and guiding means for preventing displacement of the cutting edges of the cutter during the cutting operation.

40. In a machine for cutting button blanks from pearl stock, the combination of means for firmly gripping the pearl stock, an extremely thin cutter adapted to cut through the said stock at right angles to its axis, and guiding means for preventing displacement of the cutting edges of the cutter during the cutting operation.

41. The method of cutting pearl stock into button blanks which consists in causing the cutting device and the pearl stock to approach in a direction the line of which is oblique to the line connecting the centres of the stock and cutting device.

42. The method of cutting cylindrical pearl stock into button blanks which consists in placing the centre of the stock and cutting device in different horizontal planes, and bringing them together in a horizontal direction until the cutting device has cut through the stock, whereby the curved faces of the blank being cut are always oblique to the horizontal.

43. The method of cutting cylindrical pearl stock simultaneously into a plurality of button blanks which consists in causing the cutting devices and the pearl stock to approach in a direction the line of which is oblique to the line connecting the centres of the stock and the cutting devices, and cutting through the stock simultaneously in more than two parallel planes to form a plurality of button blanks.

44. In a machine for cutting button blanks from pearl stock, the combination of a plurality of spaced cutters, devices for gripping a plurality of pearl stocks, means for bringing said devices and cutters into operative engagement in order to cut at one operation a multiplicity of button blanks from a plurality of pearl stocks, and guiding means for preventing displacement of the cutting edges of the cutters during the cutting operation.

45. In a machine for cutting button blanks from pearl stock, the combination of means for holding a plurality of pearl stocks, a gang of parallel cutters, means for bringing the pearl stocks and cutters simultaneously into operative engagement with each other to cut button blanks simultaneously from the different pearl stocks, and guiding means for preventing displacement of the cutting edges of the cutters during the cutting operation.

46. The process of making button blanks simultaneously from a plurality of pearl stocks, which consists in gripping each pearl stock firmly at a plurality of points in its length, simultaneously cutting through each of said stocks between the said points in its length at right angles to the axis of the stock, and guiding the cutting devices to prevent lateral displacement at their cutting edges during the cutting operation.

47. The process of making button blanks from a plurality of pearl stocks, which consists in gripping each of the pearl stocks firmly at a plurality of points in its length, and simultaneously cutting through each of said stocks between the said points in its length at right angles to the axis of the stock.

48. In a machine for cutting button blanks from pearl stock, the combination of means for holding a plurality of sets of pearl stocks, each set consisting of a plurality of pearl stocks, and a gang of cutters adapted to be brought into operative connection with the different sets of pearl stocks successively to cut button blanks from one set after another.

49. In a machine for cutting button blanks from pearl stock, the combination of means for holding a plurality of sets of pearl stocks, each set consisting of a plurality of pearl stocks, at a plurality of points in the length of each pearl stock thus held, a cutting device, and means adapted to cause the different sets of pearl stocks successively and the cutting device to come into operative engagement to cut said stocks successively between the holding points.

50. In a machine for cutting button blanks from pearl stock, the combination of means for holding a plurality of sets of pearl stocks, each set consisting of a plurality of pearl stocks, at more than two places in the length of each stock thus held, a gang of parallel cutters, and means for bringing the cutters and each set of pearl stocks successively one after another into operative engagement, in order successively to cut from each of said sets of pearl stocks one after the other simultaneously a plurality of button blanks, as the gang of cutters engage the pearl stocks of each set.

51. In a machine for cutting button blanks from pearl stock, the combination of means for firmly gripping the pearl stock at different points in its length, and a cutter of a thickness not substantially exceeding fourteen one-thousandths of an inch, adapted to cut through the said stock at right angles to the axis of the stock.

52. In a machine for cutting button blanks from pearl stock, the combination of means for firmly gripping the pearl stock at different points in its length, and a cutter of a thickness not substantially exceeding thirty one-thousandths of an inch, adapted to cut through the said stock at right angles to the axis of the stock.

53. In a machine for cutting button blanks from pearl stock, the combination of means for firmly gripping the pearl stock at different points in its length, a cutter of a thickness not substantially exceeding fourteen one-thousandths of an inch, adapted to cut through the said stock at right angles to the axis of the stock and guiding means for preventing displacement of the cutting edge of the cutter during the cutting operation substantially not more than three one-thousandths of an inch outside of the plane of the cutter.

54. In a machine for cutting button blanks from pearl stock, the combination of means for firmly gripping the pearl stock at different points in its length, a cutter of a thickness not substantially exceeding thirty one-thousandths of an inch, adapted to cut through the said stock at right angles to the axis of the stock and guiding means for preventing displacement of the cutting edge of the cutter during the cutting operation substantially not more than five one-thousandths of an inch outside of the plane of the cutter.

55. The process of cutting button blanks from pearl stock which consists in firmly gripping the pearl stock at opposite sides of the stock independently at a plurality of points in its length spaced apart a distance only slightly exceeding the thickness of the cutting element, and cutting through said pearl stock between said points at right angles to the axis of the stock.

56. In a machine for cutting button blanks from pearl stock, the combination of a plurality of separate gripping devices adapted to firmly grip the pearl stock independently and upon opposite sides of the stock at a plurality of points in the length of the stock, spaced apart a distance only slightly exceeding the thickness of the cutter, and a cutter, whose cutting plane is at right angles to the axis of the stock, arranged and adapted to cut thru the stock between said points.

57. In a machine for cutting button blanks from pearl stock, the combination of a plurality of separate gripping devices adapted to firmly grip the pearl stock independently and upon opposite sides of the stock at a plurality of points in the length of the stock, spaced apart a distance only slightly exceeding the thickness of the cutter, and an extremely thin cutter, whose cutting plane is at right angles to the axis of the stock, arranged and adapted to cut thru the stock between said points.

58. The process of cutting button blanks from pearl stock which consists in firmly gripping the pearl stock at opposite sides of the stock, independently at a plurality of points in its length spaced apart a distance only slightly exceeding the thickness of the cutting element, and cutting through said pearl stock between said points at right angles to the axis of the stock and guiding the cutting element to prevent lateral displacement of its cutting edge during the cutting operation.

59. In a machine for cutting button blanks from pearl stock, the combination of a plurality of separate gripping devices adapted to firmly grip the pearl stock independently and upon opposite sides of the stock at a plurality of points in the length of the stock, spaced apart a distance only slightly exceeding the thickness of the cutter, and an extremely thin cutter, whose cutting plane is at right angles to the axis of the stock, and guiding means for preventing lateral displacement of the cutting edge of the cutter during the cutting operation.

60. The process of cutting button blanks from pearl stock which consists in firmly gripping the pearl stock at opposite sides of the stock, independently at three points in its length spaced apart distances only slightly exceeding the thickness of the cutting elements, and cutting thru said stock simultaneously in a plurality of parallel planes between said points, in the same direction and at the same rate.

61. In a machine for cutting button blanks from pearl stock, the combination of three separate gripping devices adapted to firmly grip the pearl stock independently and upon opposite sides of the stock at three points in the length of the stock, spaced apart distances only slightly exceeding the thickness of a cutter, and a plurality of parallel cutters, whose cutting planes are at right angles to the axis of the stock, arranged and adapted to cut simultaneously thru the stock between said points from the same direction and at the same rate.

62. In a machine for cutting button blanks from pearl stock the combination of three separate gripping devices adapted to firmly grip the pearl stock independently and upon opposite sides of the stock at three points in the length of the stock, spaced apart distances only slightly exceeding the thickness of a cutter, and a plurality of extremely thin parallel cutters, whose cutting planes are at right angles to the axis of the stock, arranged and adapted to cut simultaneously through the stock between said points from the same direction and at the same rate.

63. In a machine for cutting button blanks from pearl stock the combination of three separate gripping devices adapted to firmly grip the pearl stock independently and upon opposite sides of the stock at three points in the length of the stock, spaced apart distances only slightly exceeding the thickness of a cutter, and a plurality of extremely thin parallel cutters, whose cutting planes are at right angles to the axis of the stock, arranged and adapted to cut simultaneously through the stock between said points from the same direction and at the same rate, and guiding means for preventing lateral displacement of the cutting edges of the cutters during the cutting operation.

64. In a machine for cutting button blanks from pearl stock the combination of three gripping devices adapted to firmly grip the pearl stock at three points in the length of the stock, spaced apart distances only slightly exceeding the thickness of a cutter, a plurality of extremely thin parallel cutters, whose cutting planes are at right angles to the axis of the stock, arranged and adapted to cut simultaneously through the stock between said points from the same direction and at the same rate, and a supporting disc interposed between adjoining cutters and concentric therewith and of a diameter sufficiently great to support the cutters throughout most of their surfaces and thereby resist lateral displacement of the cutting edges of the cutters without interfering with their cutting operation.

65. In a machine for cutting button blanks from pearl stock the combination of a series of independent grippers adapted to firmly grip the pearl stock independently at a number of points in its length and upon opposite sides of the stock and spaced apart distances only slightly exceeding the thickness of a cutter, a gang of extremely thin parallel cutters of relatively small diameter, whose cutting planes are at right angle to the axis of the stock, arranged and adapted to cut simultaneously through the stock between the points held by the grippers from the same direction and at the same rate, and a series of supporting and spacing discs, interposed between adjoining cutters, concentric with the cutters and of a diameter sufficiently great to support the cutters throughout most of their surface and to resist lateral displacement of the cutting edges of the cutters without interfering with their cutting operation.

66. In a machine for cutting button blanks from pearl stock the combination of a series of independent grippers adapted to firmly grip the pearl stock independently at a number of points in its length and upon opposite sides of the stock and spaecd apart distances only slightly exceeding the thickness of a cutter, a gang of extremely thin parallel cutters of relatively small diameter, whose cutting planes are at right angle to the axis of the stock, arranged and adapted to cut simultaneously through the stock between the points held by the grippers from the same direction and at the same rate, and a series of supporting and spacing discs, interposed between adjoining cutters, concentric with the cutters and of a diameter sufficiently great to support the cutters throughout most of their surface and to resist lateral displacement of the cutting edges of the cutters without interfering with their cutting operation, and a series of guides adapted to aid in preventing lateral displacement of the cutting edges of the cutters.

In testimony whereof, I have signed my name to this specification.

THEODORE G. ROBINSON.